United States Patent [19]

Schornack

[11] Patent Number: 4,890,002
[45] Date of Patent: Dec. 26, 1989

[54] LINE VOLTAGE FAULT DETECTOR FOR APPLIANCE PROTECTION

[75] Inventor: Louis W. Schornack, Park Ridge, Ill.

[73] Assignee: Perma Power Electronics, Inc., Chicago, Ill.

[21] Appl. No.: 257,951

[22] Filed: Oct. 14, 1988

Related U.S. Application Data

[62] Division of Ser. No. 118,257, Nov. 9, 1987, Pat. No. 4,890,005.

[51] Int. Cl.$^4$ ............................................. H02J 4/00
[52] U.S. Cl. ........................................ 307/66; 307/64; 307/87; 361/89; 361/91; 361/92
[58] Field of Search ................ 307/64, 66, 78, 82, 307/83, 84, 85, 86; 361/85, 86, 87, 88, 89, 90, 91, 92, 93; 365/226-229

[56] References Cited

U.S. PATENT DOCUMENTS

| | | | |
|---|---|---|---|
| 3,732,463 | 5/1973 | Dale | 361/87 X |
| 4,002,950 | 1/1977 | Dickerson | 361/87 X |
| 4,034,269 | 7/1977 | Wilkinson | 361/89 X |
| 4,144,551 | 3/1979 | Smith et al. | 361/93 |
| 4,191,992 | 3/1980 | Johannessen | 307/86 X |
| 4,245,184 | 1/1981 | Billings et al. | 361/93 X |
| 4,333,119 | 6/1982 | Schoenmeyr | 361/92 X |
| 4,473,756 | 9/1984 | Brigden et al. | 307/66 |
| 4,605,981 | 8/1986 | Huvet et al. | 361/91 |
| 4,638,176 | 1/1987 | Martinelli | 307/66 X |
| 4,703,191 | 10/1987 | Ferguson | 361/30 X |
| 4,709,296 | 11/1987 | Hung et al. | 361/91 X |

Primary Examiner—William M. Shoop, Jr.
Assistant Examiner—Paul Ip
Attorney, Agent, or Firm—Wallenstein, Wagner & Hattis, Ltd.

[57] ABSTRACT

A circuit breaker for the protection of electrical devices connected thereto provides immediate detection of power failure even if such failure occurs during the times of line voltage axis crossings. This is accomplished by providing and monitoring the amplitude of a synthesized waveform representing a full-wave rectified replica of the line voltage, combined with a 90° phase-shifted full-wave rectified replica of the line voltage waveform. The composite waveform has a peak-to-peak excursion of approximately 20% about a DC average without nulls. The phase-shifted waveform replicas are produced by a phase shift network configured to provide a strong differentiating function, thereby causing the phase-shifted replicas to reflect virtually instantaneously failure of the power line voltage, and in particular failure in the vicinity of an axis crossing, by an immediate change in amplitude. Transient overvoltages and undervoltages are similarly reflected. Suitable comparators are used to detect excursions beyond preset limits to produce a control signal which is used to actuate the circuit breaker to a power-off condition.

11 Claims, 6 Drawing Sheets

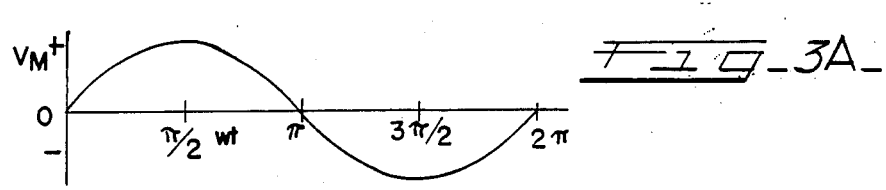
FIG_3A_
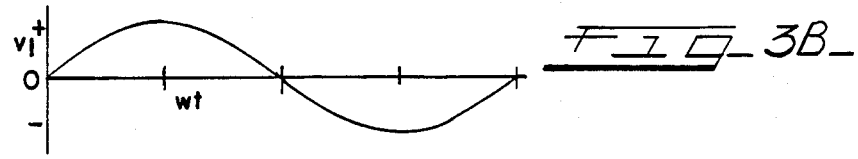
FIG_3B_
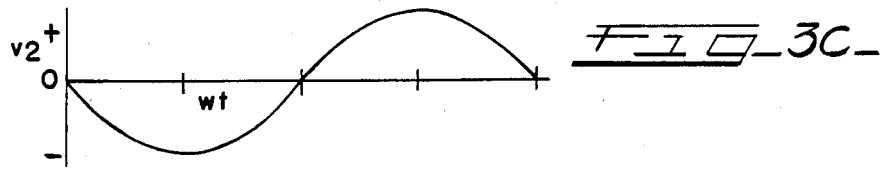
FIG_3C_
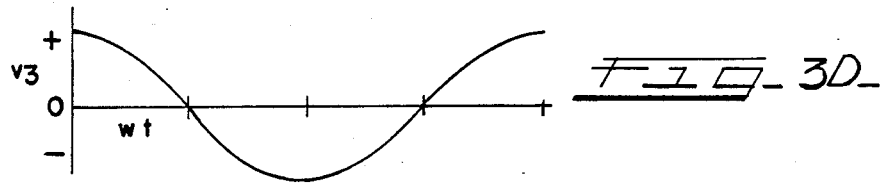
FIG_3D_
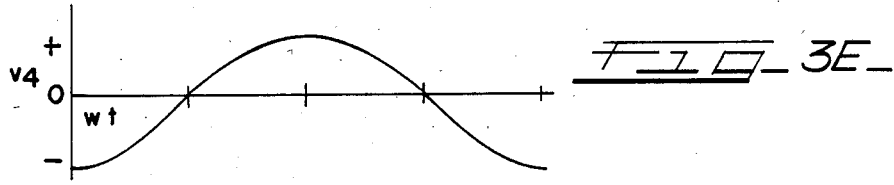
FIG_3E_
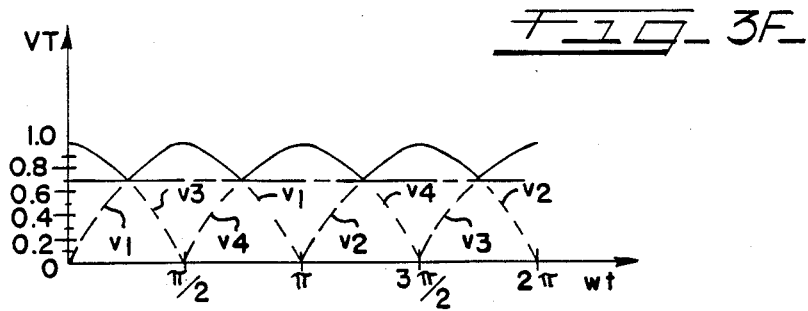
FIG_3F_

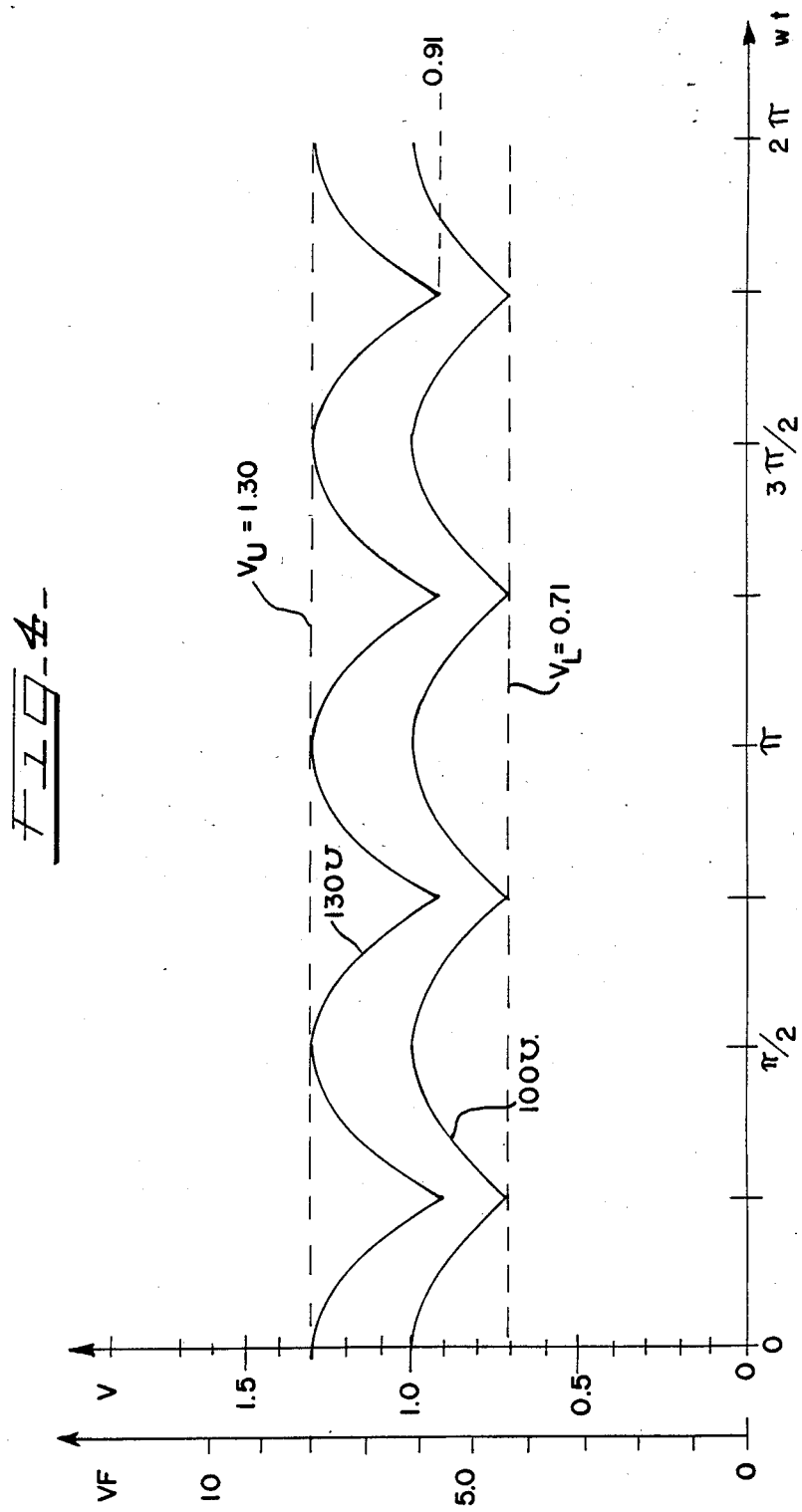

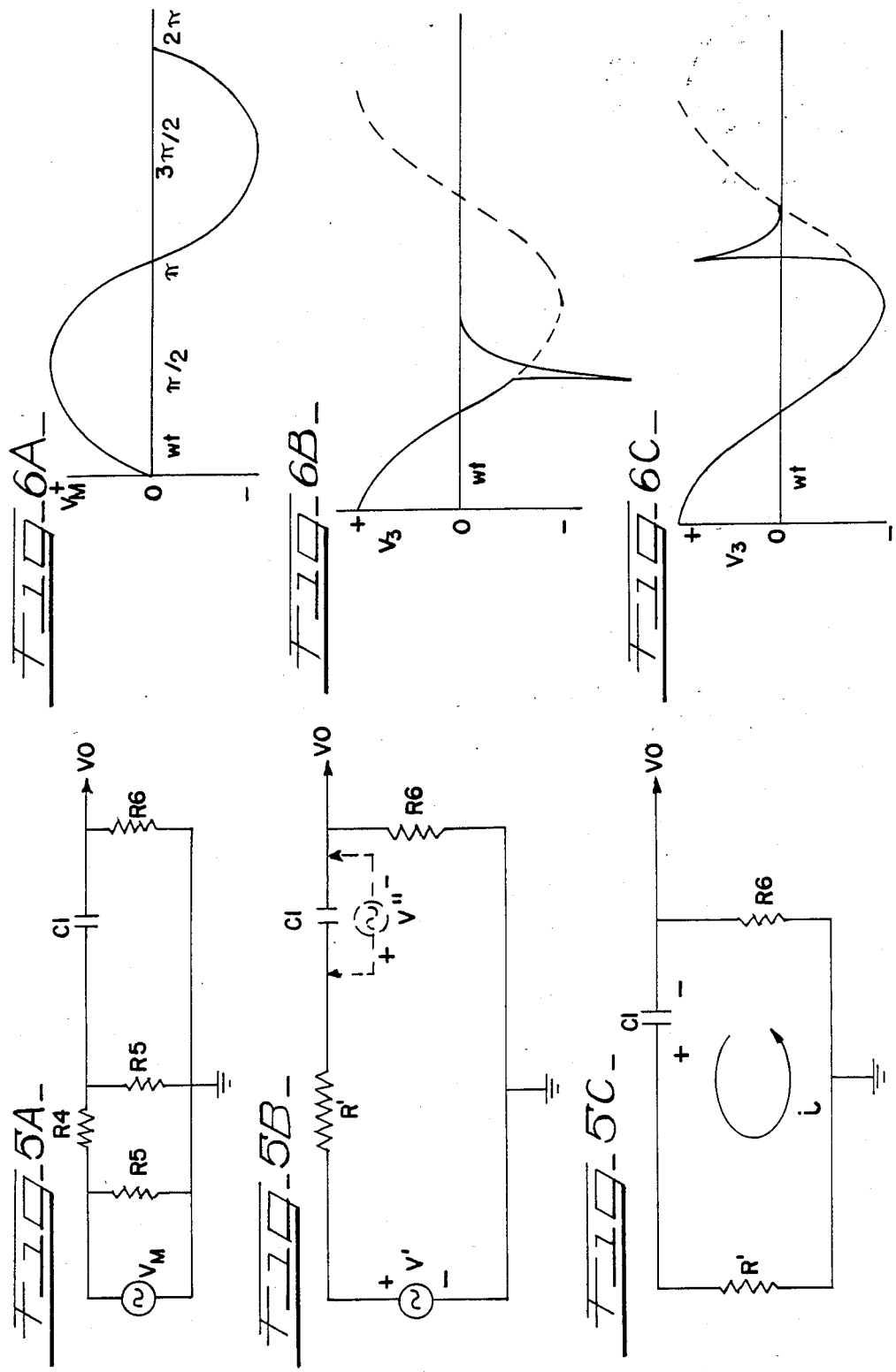

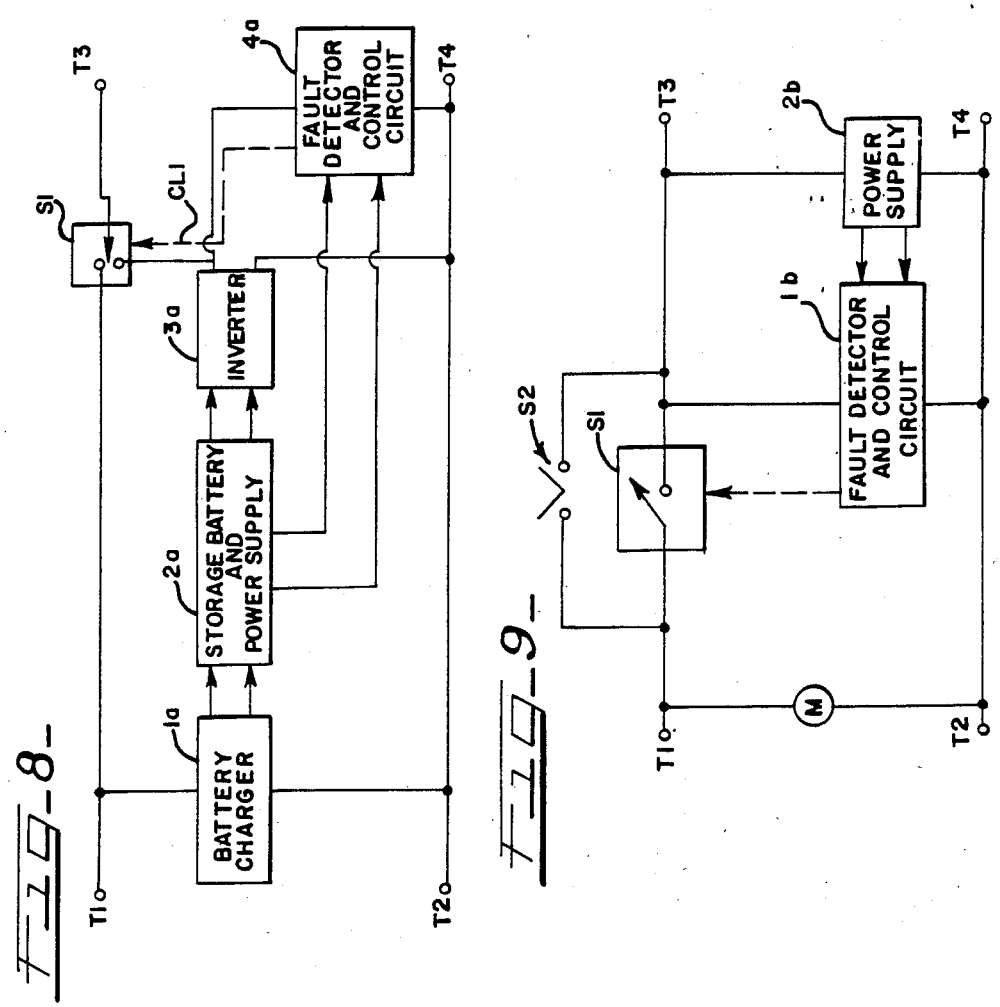
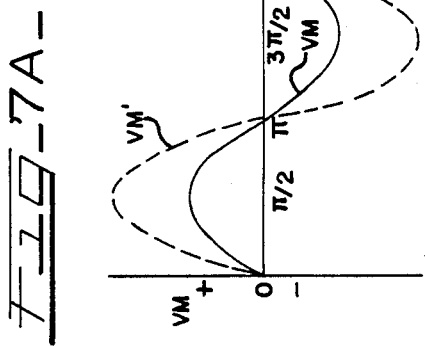
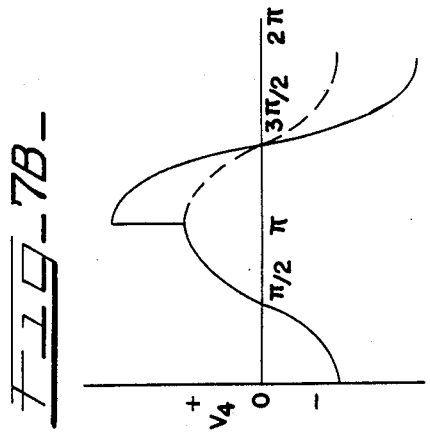

LINE VOLTAGE FAULT DETECTOR FOR APPLIANCE PROTECTION

This is a divisional of Ser. No. 118,257 filed on Nov. 9, 1987, now U.S. Pat. No. 4,890,005 issued on Dec. 26, 1989.

TECHNICAL FIELD

The technical field of the invention is the electrical control art, and in particular, electrically controlled devices for protecting an associated load against abnormal power line voltage variations.

BACKGROUND OF THE INVENTION

The use of standby power supplies containing a battery and an inverter for maintaining A.C. electrical power to computers during failure of the power lines voltage is well known. It is highly desirable that the changeover operation be carried out as quickly as possible in order to avoid the loss of the contents of volatile memory. Ideally, such changeover systems should be very quick-acting, typically in the range of one millisecond or so, since the filter capacitors of the onboard power supply of the computer are not designed to supply power for more than a time of the order of one-quarter of the line voltage waveform period, i.e., 3 or 5 milliseconds or so.

In addition to the requirement for rapid reaction time for achieving the changeover from line power to battery power, there remains the problem of providing a power line voltage fault detector which will give a rapid and unambiguous reaction to power line abnormalities mandating system changeover from normal power line operation ("line mode") to battery-powered operation ("battery mode"). In addition to total power line voltage failure, such abnormalities also include transient and relatively long-term line overvoltage and undervoltage conditions as well.

A great variety of voltage comparator circuits exist which respond to variations in the peak value of the power line voltage waveform to detect such conditions, and to initiate system changeover in response thereto. To the applicant's knowledge, none of these systems is configured to respond immediately to one mode of power line voltage failure of significant statistical likelihood, namely, complete failure of the power line voltage at or in the immediate vicinity of an instantaneously zero line voltage condition, i.e., at an axis crossing. There remains a need for a power line fault detector which will not only respond to more conventional out-of-range conditions, but which will also respond immediately to total failure of the power line voltage at an axis crossing.

Finally, there is a need for a voltage abnormality detection circuit which will respond instantaneously to a catastrophic in-phase rise in the power line voltage. One particularly dangerous condition can be created by accidental breaking of the neutral line in a Y-connected three-phase system feeding a local power distribution network. The result of such line interruption and the resulting imbalance causes the power line voltage in the various phases to undergo a gross continuing phase-coherent increase in power line voltage amplitude. Conventional comparators may readily respond in sufficient time to cope with such changes, provided that the circuit interruption occurs at or near the peak amplitude of the normal power line voltage. If, on the other hand, such an interruption occurs in the vicinity of an axis crossing, then thereafter, and in particular in the next quadrant, the sine wave is characterized by a grossly increased amplitude, and during the time this wave form is rising from zero to a value which will trigger a conventional comparator, the rate of rise of the line voltage during the first portion of the rise is so high as to cause damage to electrical systems. Such accidents are not unknown, and frequently result in permanent damage to a great number of electrical accessories connected to the power lines at that time. Accordingly, there is a need for a voltage abnormality detection circuit which will guard against such situations.

CROSS-REFERENCE TO RELATED APPLICATION

This application is a continuation of application Ser. No. 07/118257 filed on Nov. 9, 1987 which is now U.S. Pat. No. 4890005.

SUMMARY OF THE INVENTION

According to one of the broadest features of the invention, a waveform-producing circuit for such a power supply is coupled to input power line terminals so as to provide an output waveform of nonzero amplitude spanning power line voltage axis crossings responsively to a generally sinusoidal voltage applied thereto. The waveform-producing circuit has the property of causing the output waveform to respond to failure of power line voltage during an axis crossing by changing its output waveform amplitude essentially synchronously with the occurrence of such failure, such response being characterized by a virtually instantaneous response time in comparison with the power line voltage period. A detector circuit is responsively coupled the waveform-producing circuit, and provides a power failure control signal condition responsively to such change in the waveform-producing circuit output waveform. In the preferred embodiment the waveform-producing circuit includes means for providing significantly phase-shifted replicas of the line voltage waveform having nonzero values spanning the axis crossing range thereof. The circuit includes means for causing the replicas to reflect transient disturbances of the power line voltage by a change in amplitude, the network being configured so that the disturbance in the replica occurs synchronously with the time of its occurrence in the power line waveform. The detector circuit responds to these changes in replica amplitude to provide a system changeover control signal.

According to a specific aspect of this broadest feature of the invention, the phase-shifted replicas are derived from a differentiating phase shift network driven by the power line voltage. The rapid pass-through of transient power line voltage conditions is achieved by configuring the phase-shift network to have a decay time extremely short with respect to the period of the power line voltage. By this means, the out-of-phase replicas will be at a maximum value if power line failure occurs during an axis crossing, and because of the high-speed differentiating property of the network, the replica virtually instantaneously drops from its maximum value to zero, thereby reflecting the power line failure instantaneously to actuate the detector.

According to a related feature of the invention, the phase-shifted replica waveform is effectively full-wave rectified to provide a phase-shifted train of positive half-wave pulses. An unshifted train of such pulses is similarly produced by effectively full-wave rectifying unshifted replicas of the power line voltage waveform. These two sets of full-wave rectified waveforms are then combined, the resultant waveform being a pulse train of relatively modest excursions about an average value and having no nulls. Power line failure at any time causes an abrupt change in the amplitude of this resultant waveform. A detector comparator circuit set to respond to excursions beyond the limits of corresponding normal power line variation is used to activate suitable control circuitry for actuating a standby power supply.

According to an independently claimed feature of the invention, the foregoing system also finds application to a circuit breaker which will interrupt electrical power flow in case of sudden power line imbalance of the type previously mentioned by responding to the increased rate of change of power line voltage.

Other features and aspects of the invention will become apparent upon making reference to the specification, claims, and drawings to follow.

DESCRIPTION OF THE DRAWINGS

FIGS. 3A-3F represent voltage waveforms at various points in the circuit of FIG. 2.

FIG. 4 shows composite voltage waveforms produced by the detector circuit under 100-volt and 130-volt line voltage input conditions.

FIGS. 5A-5C show the development of an equivalent circuit or portion of the network shown in FIG. 2, showing equivalent reductions for purposes of transient analysis.

FIGS. 6A-6C show respectively the power line waveform, the voltage waveform $v_3$ under power line failure conditions in the third quadrant of the power line voltage of FIG. 6A, and a similar situation attendant to power line failure in the fourth quadrant of FIG. 6A.

FIG. 7A shows a normal power line voltage waveform, as well as a massively increased in-phase power line voltage waveform resulting from a sudden imbalance in a three-phase power distribution system.

FIG. 7B shows the response of of the interior waveform shown in FIG. 3E in the event that the imbalance occurs at a power line voltage axis crossing.

FIG. 8 is a block schematic diagram of the principal elements of a representative uninterrupted power supply of the "on-line" type.

FIG. 9 is a block schematic diagram of the principal elements of an automatic A.C. power circuit breaker.

DESCRIPTION OF THE INVENTION

Figure 1:
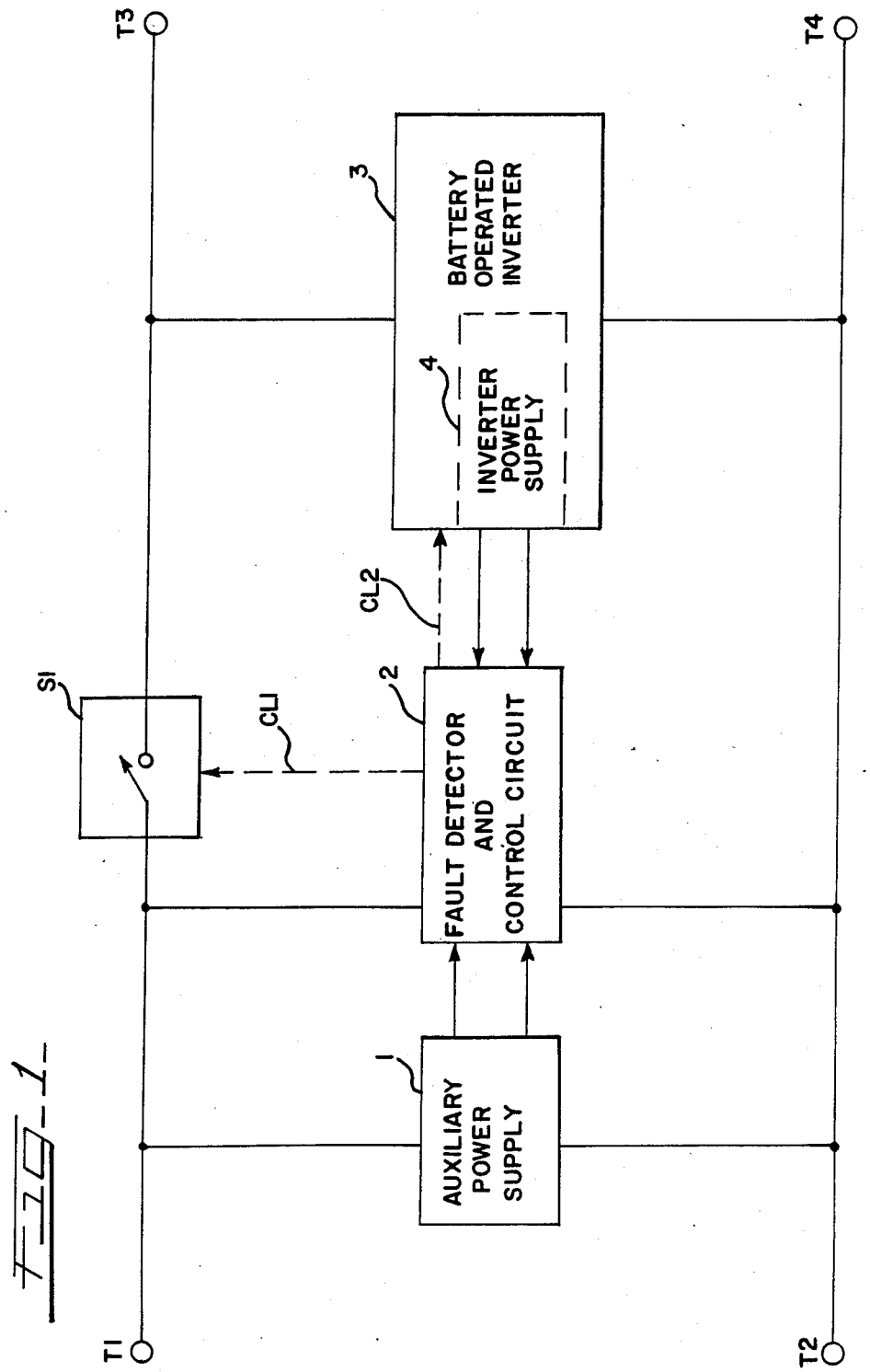
FIG. 1 is a block schematic diagram of the principal elements of a representative standby power supply of the "off-line" type.

FIG. 1 shows the principal elements of a representative standby power supply system of the "off-line" type. Input voltage from the power line is applied to input terminals T1, T2. Output terminal T4 is directly connected to input terminal T2, and output terminal T3 is coupled through a power switch S1 to input power terminal T1. Power switch S1 may in practice take a variety of forms, most commonly one or more semiconductor switches, or alternatively a mechanically driven relay. A fault detector and control circuit 2 is connected across the input terminals T1,T2 to monitor the input waveform and to produce appropriate control signals on control lines CL1 and CL2 in the event that a power line abnormality is detected. Under acceptable line voltage conditions, power is supplied to the fault detector and control circuit 2 by means of an auxiliary power supply 1 connected across the input terminals T1,T2. As long as the input power line voltage is within acceptable limits, the fault detector and control circuit 2 maintains the switch S1 in a closed condition by an appropriate control signal condition on control line CL1. A battery-operated inverter 3 is connected across the output terminals T3,T4. It is energized from a dormant to a power-producing state responsively to an appropriate control condition on line CL2. As long as the input power line voltage received at the input terminals T1,T2 is within acceptable limits, the fault detector and control circuit 2 commands the inverter 3 to a dormant, non-energized condition.

When an input voltage abnormality of sufficient magnitude requiring changeover to battery operation is sensed, the fault detector and control circuit 2 actuates the inverter 3 to an active power-producing mode, and simultaneously opens switch S1. Power is now supplied to the output terminal T3,T4 by the inverter 3. Inverter 3 contains an internal power supply 4 which not only powers the associated circuitry of the inverter, but which will also supply to the fault detector and control circuit 2 in this mode of running. This is necessary because the fault detector and control circuit must remain continuously powered in the event of total power failure at the input terminals T1,T2, thus shutting down the auxiliary power supply 1. The fault detector and control circuit 2 is thus maintained in an active mode to respond to subsequent restoration of input power line voltage within acceptable limits, whereupon reversion to the original standby mode is carried out.

FIGS. 2-4, 6A-6C, 7 show a circuit for reacting rapidly to detect power line voltage abnormalities, and the waveforms associated therewith. A replica of the power line voltage $V_M$ between input power terminals M1,M2 is provided via a resistive attenuator R1, R2 having a nominal attenuation of the order of 30 to 1 or so. This attenuated signal is fed directly to the anode of a diode D1, having its cathode connected to a summing resistor R3. Half-wave voltage pulses $v_1$ are therefore provided to the diode D1, these voltage pulses being in phase with the line voltage $V_M$ as shown in FIG. 3B. A unity gain analog inverter I1 similarly feeds an inverted analog replica $v_2$ of the power line waveform to the summing resistor R3 through the anode of diode D2.

A substantially less attenuated replica of the power line voltage $V_M$ is provided through a resistive attenuator R4,R5 having nominal values of 10 kilohms and 22 kilohms, respectively. This waveform is passed through a differentiating phase-shift network consisting of capacitor C1 connected to feed the output of the attenuator R4,R5 to resistor R6, having a nominal value of 5 kilohms. Capacitor C1 has a nominal value of 0.033 microfarad, and thus has a capacitive reactance at power lines frequency (60 Hertz) of the order of 80 kilohms. This value is twenty times the value of resistor R6. Thus, voltage pulses $v_3$ are delivered to diode D3 to supply current pulses to the resistor R3, but displaced in phase with respect to voltage pulses $v_1$ by approximately 90°. A corresponding replica $v_4$ of the remaining half-waves of the phase-shifted waveform supplied by the phase-shift network C1,R6 is similarly provided via an analog inverter I2 to resistor R3 through the cathode of diode D4.

The total waveform developed across resistor R3 is shown in FIG. 3F, which shows the voltage VT developed across resistor R3 as a summation of individual voltage pulses $v_1, v_2, v_3, v_4$. It should be noted, however, that the composite waveform VT developed across resistor R3 is not a simple summation of the voltage applied to the diodes D1-D4, since in general only one of these diodes will be conducting at any given time. Thus, considering, for example, the waveforms $v_1$ and $v_3$, as long as $v_3$ is greater than the voltage $v_1$, diode D3 will be conducting, and the output voltage VT will be held at the relatively high value $v_3$, therefore holding diode D1 in a blocking condition. This state of affairs will continue until the waveform $v_1$ rises to equal the falling value of waveform $v_3$, as shown in the first quadrant of FIG. 3F. Beyond this point diode D3 is turned off, and diode D1 is turned on. The output voltage waveform VT developed across resistor R3 therefore always represents the magnitude of the largest of the four voltage waveforms $v_1$-$v_4$ present at any time.

Normalizing these individual voltage pulses to unity amplitude for purposes of discussion, the resultant voltage $V_T$ is a time-varying waveform having a frequency four times the power line frequency, and characterized by maximum values of 1.0 and minimum values of 0.71.

Referring to the values of the capacitor C1 and the resistors $R_S$, R4, R5 and R6, it may readily be established that the actual phase shift produced by this network is approximately 82°. FIGS. 2A-2E show idealized situations wherein 90° phase shifts are assumed; however, the slight difference between the actual and the ideal phase shift has a negligible effect in terms of the idealized description given hereinabove. Resistor R7 represents associated system loads, e.g., power supplies, etc., and is given a nominal value of 2 kilohms.

In the particular case of total failure of power line voltage, it is clear that the unshifted voltage pulses $v_1, v_2$ will vanish essentially instantaneously if the power failure occurs during their respective durations. With respect to the phase-shifted current pulses $v_3, v_4$, a power failure occurring exactly at a power line voltage axis crossing, as, for example, at 180° FIG. 3A, will cause the waveform $v_4$ shown in FIG. 3F to immediately collapse to zero.

This may be seen from FIG. 2 as follows. Under normal power line conditions, the instantaneous voltage across capacitor C1 will be very nearly equal to the instantaneous voltage across resistor R5. This follows because the reactance of capacitor C1 is of the order of 80 kilohms, a value well in excess of the resistance of resistor R6, and of the parallel combination of resistors R4 and R5. Thus, to this degree of approximation, the voltage across capacitor C1 closely follows and is equal to the voltage delivered at the juncture of resistors R4 and R5. It therefore follows that if the power line voltage fails at an axis crossing, i.e., at a point where it is instantaneously zero, then the voltage across capacitor C1 is similarly zero. An open-circuit condition exists at that time between the power input terminals M-M and the generating stations supplying power to the power lines. Since no voltage is being delivered to the input power terminals M-M, and since there is no instantaneous charge on capacitor C1, it follows that the voltage across resistor R6 will instantaneously fall to zero, as a result of which the composite voltage waveform produced across resistor R3 must also instantaneously go to zero. In the case of line voltage failure at points significantly removed from axis crossings, the transient behavior of the voltage VT is quite complex. Discussion of this aspect of system operation will be deferred until the remaining circuitry has been described.

It will further be noted that if the power line voltage should slowly rise to unacceptable limits, as is sometimes encountered in poorly regulated electrical distribution systems, then it is clear that the composite waveform VT shown in FIG. 3F will similarly undergo a general upward shift. Conversely, if the line voltage undergoes a relatively slow decrease, the composite waveform VT shown in FIG. 3F will similarly undergo a corresponding gradual shift downwards.

Finally, it should be observed that the appearance of sudden transients at the input terminals M-M will in general be faithfully replicated across resistor R6 because the high value of the reactance of capacitor C1 renders the network R4-R5-R6-C1 to be a differentiating network. Such transients will therefore instantaneously appear superimposed on the composite waveform VT as a result.

To establish the desired limits at which an error-detection control signal will be produced, the output voltage VT developed across resistor R3 is fed to the inverting input of a comparator AC2 and to the non-inverting input of a comparator AC1. The inverting input of comparator AC1 is set to a chosen value by adjustment of potentiometer P1 so as to bias this input at a chosen value which will trigger comparator AC1 to output a low (grounded output) state whenever VT rises above a chosen bounding value. Similarly, the non-inverting input of comparator AC2 is adjusted to a chosen bias via potentiometer P2 to set a lower bounding value of VT. Thus, any excursion of the voltage VT above the maximum value established by the setting of potentiometer P1, or alternatively below the minimum value established by potentiometer P2, will cause the output of the associated comparator to go low.

FIG. 4 shows two composite waveforms. The upper waveform has been chosen to correspond to a maximum allowable r.m.s. line voltage of 130 volts, and has been normalized for illustrative purposes to have its peak amplitude at 1.30 volts. The vertical axis labeled VF is to be temporarily ignored. Since the composite waveform has a minimum value of 0.71 times its peak value, then it follows that this waveform has for its lower bound the value of 0.91 volts. The lower waveform corresponds to a minimum allowable input r.m.s. line voltage of 100 volts, and correspondingly has a maximum value of 1.0 volts and thus has a minimum value of 0.71 volts. Accordingly, to cause the comparator C3 to trigger low above 130 volt line input, its inverting input is established at a potential of 1.30 volts by an appropriate setting of potentiometer P1. Similarly, the non-inverting input of comparator C2 is set to a value of 0.71 volts. If the line voltage falls below 100 volts, then this comparator will be similarly triggered low.

In a practical standby power supply system it is desirable that the power supply not be actuated from line to battery mode responsively to short transients of minor importance on the power lines. Also, in the event that the power line voltage excursions shown in FIG. 4 pass slightly beyond the upper or lower limits, then it is clear that the responsive comparator AC1 or AC3 will be continuously triggered at a rate of 240 times per second. For self-evident reasons, it is not desirable that such comparator pulsing cause 240-cycle actuation of the output control line LC between states commanding a change from line mode to battery mode and vice versa.

Immunity from undesired triggering from minor transients of relatively short duration, as well as elimination of the undesired 240 Hertz oscillation is achieved as follows. It will be recalled that comparators AC1 and AC2 are connected so that when their associated input voltage limit is exceeded, their outputs go low, by which is meant that their output stage transistors are turned on, i.e., comparators AC1 and AC2 are of the open-collector type, such as type LM339.

With particular reference to the high voltage warning circuit based upon comparator AC1, the output is connected to a resistor R15, this resistor in turn being connected to the positive system supply rail through resistor R14. Across resistor R14 is a capacitor C2 of nominal value 0.1 microfarad. Resistor R14 has a nominal value of 330 kilohms and R15 has a nominal value of 2.2 kilohms. As long as the line voltage is less than the maximum allowable value, the output line LA of comparator AC1 will be open, thus causing line LA to idle at the positive rail voltage. Responsively to any transition of the power line waveform above the maximum value established by the setting of potentiometer P1, comparator C1 will trigger, thus essentially grounding output line LA. The voltage across resistor R14, however, is momentarily held at zero by capacitor C2, and the change of state of output line LA is not reflected at the juncture between resistors R15 and R14 until a time established by the charging time of the network R15-C2 elapses. This decay time is approximately 200 microseconds. As a result of this, short-term transients of the 100-microsecond range are not passed to the input of driver DR1.

With respect to the previously mentioned 240 Hertz triggering problem, although capacitor C1 will in fact trigger at this rate, thus grounding output line LA 240 times per second, under such circumstances a rapid return of this line to the positive rail voltage is prevented by the holding action of capacitor C2 across resistor R14. A low-to-high transition at output line LA under such circumstances will be characterized by a relatively slow rate of rise on line LD, being characterized by the decay time of the network R14-C2, a value of the order of 30 milliseconds, which is much longer than the 4 millisecond period of the 240 Hertz waveform. Thus, line LD will be held low, and will have a relatively modest ripple component on it. To prevent this ripple component from appearing on output control line LC, a Schmitt trigger (latching comparator) circuit, based upon driver DR1, is employed. An input resistor R7 of 560 kilohms is inserted in line LD to drive the input of driver DR1. A positive feedback resistor R8 of nominal value of one megohm is connected therearound. A significant feedback hysteresis is produced in the triggering of driver DR1 to prevent re-triggering by such ripple on the input waveform.

The output of driver DR1 is connected to the anode of diode D5, the cathode of which is connected to line LC, line LC being tied to the positive system rail through resistor R4. Consequently, when the input line voltage exceeds the range set by potentiometer P1, line LC is pulled to ground.

Considerations identical to the foregoing are applicable to the low-range comparator system using comparator AC2. As in the case of comparator AC1, an out-of-range condition causes the output line LB of comparator AC2 to be grounded. A similar rapid attack and slow release network consisting of resistors R9,R10,C3 driving a similar Schmitt trigger based upon driver DR2 is used to pull line LC down through diode D6 to again place an out-of-range low state on the control line LC.

The behavior of the composite waveform VT under conditions of total power line failure in regions remote from axis crossings of the power line voltage must now be considered in more detail. FIG. 5A shows the Thevenin equivalent of the circuit elements of FIG. 2 supplying the output voltage V0 to the anode of diode D3 and to the inverting input of inverter I2. The A.C. voltage source is equal in magnitude to the voltage $V_M$ applied to the input terminals M-M. This may be further reduced by well-known principles to yield the equivalent network shown in FIG. 5B having an A.C. voltage source V' in series with an equivalent resistance R'. In terms of the circuit values shown in FIG. 2, R' has the approximate value of 8 kilohms, and the equivalent generator V' produces a voltage approximately equal to 0.70 times the value of $V_M$. Recalling the previous approximation of the reactance of capacitor C1 is the dominant element in the loop of FIG. 5A (and also FIG. 5B), it follows that the voltage across capacitor C1 may be approximately be set equal to the instantaneous voltage of the equivalent generator V' in the manner shown in FIG. 5B. The phantom generator V" is shown merely to establish for purposes of discussion the magnitude of the voltage across C1 at any instant of time. It will be essentially equal to the voltage of the equivalent generator V', and will have instantaneous polarity as shown, i.e., opposing the voltage V'.

FIG. 5C shows the transient situation in this network in the event that the power line voltage delivered to input terminals M-M (FIG. 2) instantly fails, as, for example, when a power line breaks. The equivalent network under such conditions is as shown in FIG. 5C, and will result in a transient current i flowing in the direction shown according to the polarity shown. Thus, if the voltage fails when voltage $V_M$ shown in FIG. 2 is above ground, i.e., positive, then the capacitor C1 will be charged as indicated in FIGS. 5B and 5C. Such failure must result in immediate current flow i to produce an immediate negative output voltage V0. The magnitude of this voltage will be the instantaneous value of the voltage V' reduced by the network attenuation, i.e., by a factor R6 divided by the sum of R6 and R'. In terms of previously stated values, this attenuation will have a value of approximately 0.39.

One may generalize the transient behavior of the output voltage V0 in the event of power line failure as follows. Irrespective of what voltage V0 was present before failure, the output voltage V0 immediately reverts to a value equal to the instantaneous voltage present on capacitor C1, i.e., power line voltage $V_M$ reduced by the factor 0.39 and reversed in phase with respect thereto. Since peak power line voltages can exceed 100 volts, it is clear that V0 under certain circumstances can reach values of the order of 40 volts or so. After this immediate reversion to a new value, V0 then decays to zero as capacitor C1 discharges through resistors R6 and R' at a rate set by the network decay constant. In terms of the values derived, the network decay time constant is approximately 0.4 milliseconds. In line with the previous discussion of power line failure immediately at an axis crossing, it is clear that, the instantaneous power line voltage being zero, the voltage V0 simply drops instantly to zero. Consideration must now be given in view of the foregoing to situations wherein the power line voltage fails in regions significantly remote from axis crossings.

Figure 2:
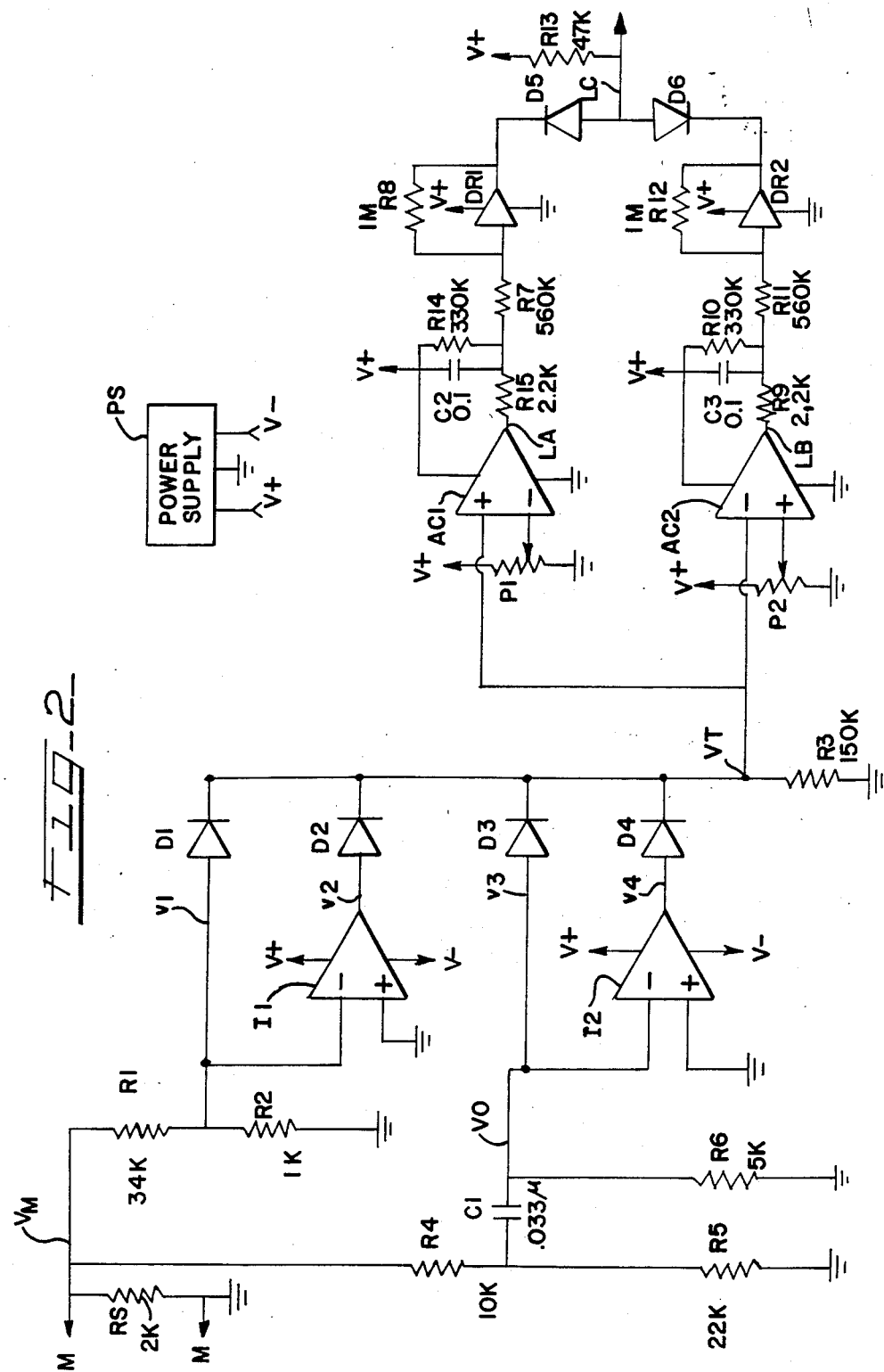
FIG. 2 is a schematic diagram of a detector circuit for the instantaneous detection of voltage abnormalities of power line voltage.

Consideration must be first given to establishing the proper magnitude of the voltage V0 of FIGS. 2 and 5A. It will be recalled that the voltage acceptance range of the comparators AC1,AC2 are 130 volts r.m.s. and 100 volts r.m.s., respectively. With respect to the high range setting, 130 volts r.m.s. corresponds to a peak voltage of 182 volts, resulting in a steady state peak output voltage V0 of 8.0 volts. This is derived from the equivalent circuit of FIG. 5B wherein the dominant element in the loop is the capacitive reactance of C1 of 80 kilohms and the equivalent voltage source V' is equal to 0.7 times the power line voltage $V_M$. Thus, the high range output voltage limit for voltage V0 is 8.0 volts. This may be seen in the left-most vertical axis VF shown in FIG. 4. The out-of-range signal level corresponding to 100 volts r.m.s. input may similarly be shown to produce a peak output voltage V0 of 6.2 volts, yielding for its minima the value of 4.4 volts. Thus, the comparators AC1,AC2 must be set to trigger at 8.0 volts and 4.4 volts, respectively.

It is now necessary to consider the magnitude of the transients in the output voltage V0 under power line failure conditions at points substantially remote from, for example, 180° in the reference waveform of FIG. 6A. FIG. 6B shows the general behavior of the non-inverted output voltage waveform $v_3$ of FIG. 2. It should be recalled at this point that in the event of power line failure, voltage waveforms $V_1$ and $V_2$ instantaneously go to zero. All that must be considered here is the behavior of the output voltage V0. It will also be recalled that the voltage across the resistor R3 will be that of the dominant positive voltage of the pair $v_3, v_4$. To analyze this situation, consideration need only be given for the moment to the waveform $v_3$.

As previously pointed out, if the power line voltage $V_M$ of FIG. 6A fails exactly at the 180 20 point, then, referring to FIGS. 5B and 5C, there is no initial voltage on capacitor C1, and the voltage $v_3$ will immediately collapse to zero. A similar situation will, of course, occur with respect to voltage $v_4$. If, on the other hand, power line failure occurs well in advance of this point, i.e., somewhere in the second quadrant of the line voltage $V_M$, then an immediate negative transient will appear on the $v_3$ waveform having its initial value equal to the equivalent value V', i.e., 0.7 times the instantaneous value of the power line voltage $V_M$. As previously stated, this voltage will have for its immediate peak value a voltage equal to the equivalent generator V' reduced by the attenuation factor of the network R',R6, i.e., by 0.39.

It will be appreciated that these initial transients can be extremely strong. Thus, it may be readily shown that if the power line voltage $V_M$ exceeds 29 volts, then the negative transient shown in FIG. 6B will immediately reach a value in excess of 8.0 volts. Such a situation will be expected throughout virtually the entire first and second quadrants of the power line waveform $V_M$. Any power line failure in this entire range will cause an immediate negative transient value of the output voltage V0 to be in excess of 8.0 volts. Although $v_3$ is a negative transient, it will be recalled that $v_4$ is produced through the inverter I2, as a result of which $v_4$ is the dominant positive waveform in the network. This will result in a voltage VT across resistor R3 in excess of the high range triggering level of 8.0 volts, and will cause the comparator C1 to output an out-of-high range condition. Because of the previously mentioned latching action in the comparator circuits, and for further reasons discussed below with respect to an intermediate situation, the latching condition on the output line LC will be maintained after the transient voltage $v_3$ has decayed with its characteristic time constant of 0.4 milliseconds, during which process comparator AC2 will trigger to an out-of-low range condition, to remain there until subsequent restoration of power line voltage.

There is, however, an intermediate situation when power failure occurs at a voltage slightly below 29 volts in the region immediately prior to the 180° point of the power line voltage $V_M$ of FIG. 6A. This will cause the negative transient in the voltage $v_3$ to just fail to reach the requisite 8.0 volt level to secure initial triggering of the high range comparator AC1. In such a case, a period of time must elapse for the transient to decay below the setting of the low range comparator. It will be appreciated, however, that the high range setting is 8.0 volts, and that the low range setting is 4.4 volts. Thus, a transient having an initial value of 8.0 volts, and characterized by a decay time of 0.4 milliseconds, will only require about 0.2 milliseconds to reach the lower triggering level of 4.4 volts. Thus, even in such intermediate cases, rapid triggering in the submillisecond range is achieved.

Furthermore, with respect to transients having an initial value in excess of 8.0 volts, the high range comparator AC1 will remain in a triggered state at least until the transient voltage decays to 8.0 volts, after which time it reverts to an untriggered state; however the output voltage of driver DR1 will remain in a low state for a significant period of time thereafter because of the previously mentioned off-setting of the thresholds of this Schmitt trigger circuit, further augmented by the 33 millisecond decay time of the holding network C2-R14. This time interval is more than sufficient to allow the voltage waveform to decay to the lower triggering value of 4.4 volts, thus maintaining the prerequisite output state on line LC.

Considering next power line failure in the third and fourth quadrants of FIG. 6A, here a positive transient is produced, and throughout most of this range it will be of sufficient value to markedly exceed the high range threshold of 8.0 volts. Here the voltage $v_3$ is the dominant positive voltage of the network, and appears across resistor R3 to trigger the high range comparator AC1. The low range comparator AC2 may momentarily trigger, but will remain in such a state for such a short time that drive DR2 is not latched. As before, an intermediate case will occur when the power line voltage fails immediately to the right of the 180° point of FIG. 6A. In the immediate region of this point, the positive transient will be insufficient to trigger the high range comparator AC1. Thereafter, as before, the low range comparator will not trigger until the transient has decayed to 4.4 volts. In the worst case, this will occur when the transient is just slightly below 8.0 volts, and as before, approximately 0.2 milliseconds will have to elapse until the low range comparator is triggered.

From the foregoing it will be seen that throughout all quadrants of the power line voltage the system will be triggered by power line failure to output an appropriate control signal condition on line LC characterized a response time in the submillisecond region. Not only are such total failures accurately and immediately sensed, but general out-of-range conditions are also sensed to produce a similar control signal condition, and intermediate transients of a pre-established duration are also similarly sensed.

Mention has been made in the Background of the Invention of one mode of power line failure that can cause massive damage to electrical equipment, namely, breakage of the neutral lead of the three-phase power distribution network, giving rise to a sudden in-phase rise of the power line voltage wave form. Such a situation is shown in FIG. 7A, wherein the dotted curve VM' is here taken to have a value twice the normal power line voltage VM. If the breakage occurs in regions generally close to the power line voltage maxima, then this change will be reflected by an immediate change in the amplitudes of wave forms $v_1$ and $v_2$ of FIG. 3F, resulting in immediate detection of this condition.

If, on the other hand, this failure occurs at a axis crossing, as for example at the 180° point of FIG. 7A, the differentiating property of the network providing wave forms $v_3$ and $v_4$ will give rise to an abrupt increase in the composite wave form of FIG. 3F. This may be seen as follows: it will be recalled that the impedance of capacitor C1 is the dominant impedance in the network shown in FIGS. 5A-5B, causing the current through capacitor C1 to be approximately equal to the rate of change of the equivalent source voltage V'. As a result, the voltage developed across resistor R6 is generally proportional to this same rate of change. It is this differentiating property that gives rise to the phase shifted wave forms $v_3$ and $v_4$. In the event that the transition from normal power line voltage VM to the abnormally increased wave form VM', shown in FIG. 7A, occurs at, for example, 180°, then it is clear that the rate of change of the power line voltage has greatly increased in value. From the foregoing discussion, it will be evident that the voltage $v_4$ will undergo an immediate change as shown in FIG. 7A, immediately triggering the high range comparator AC1. For illustrative purposes, the power line voltage has been assumed to undergo a doubling of its peak value, resulting in a virtually instantaneous doubling of the peak value of the wave form $v_4$. Similar considerations apply to the inverted wave form $v_3$, and the result is that if such a coherent power line voltage change occurs in the region of either of the axis crossings an out-of-range signal condition will be sent to the comparator AC1.

Thus, not only has provision been made for producing a control signal indicative of total power line failure at any time, but also provision has been made for producing a similar control signal condition in the event that the line voltage should drift between the acceptable limits of 100-130 volts r.m.s. Moreover, by use of phase-shifted waveforms superimposed upon unshifted waveforms and by using a phase shifter characterized by very rapid response times, the desired rapid response to major power line transients and power line failures occurring at any time, and in particular during axis crossings, is achieved. These transients are readily detected to produce a reliable control signal which may be used to actuate the transition from line mode to battery mode in a standby power supply.

The previous discussion has been oriented with respect to energization of a standby power supply of the "off-line" type, by which is meant an inverter which is in a dormant state as long as acceptable power line voltage conditions exist, and which is immediately activated to supply power to the associated load during periods of unacceptable line voltage abnormality. FIG. 8 shows the principles of the instant invention as applied to a power supply of the "on-line" type. By this is meant a battery operated inverter constantly supplying power to the associated load from a storage battery, the storage battery being continuously charged from the power lines. FIG. 8 shows in block schematic form the principal elements of such a power supply. A battery charger 1a constantly connected to the input terminals T1, T2, and constantly supplies power to a storage battery and power supply 2a, which in turn constantly powers an inverter 3a. In normal operation, a single pole-double throw switch S1' is actuated by a fault detector and control circuit 4a to connect power output to the output terminals T3, T4. Power for the fault detector is provided by the storage battery and power supply 2a. Here the fault detector and control circuit is directly to the output terminals T3, T4, i.e., to the inverter output, and its function is to sense inverter failure and to actuate switch S1' to connect the input terminals T1, T2 directly to the output terminals T3 and T4, responsively thereto.

The voltage abnormality detector previously described is fully applicable to such a system as shown in FIG. 8. Thus, it will be noted that provision should be made to insure that voltage developed between input terminals T1, T2 is within acceptable limits before commanding such reversion of switch S1. Also, a second voltage abnormality detection circuit may be connected across the input terminals T1, T2 to prevent a dangerous transition to direct power line voltage supply. This may be accomplished by a variety of means, as will be evident to those of ordinary skill in the art.

Finally, the principles of the instant invention may be applied to form a simple, relatively inexpensive quick-acting circuit breaker which does not supply an alternative source of power to the associated load, but which merely safely and rapidly disconnects the load from power lines in the event of dangerously high input voltage conditions. FIG. 9 is a block schematic diagram of the principal elements of such a circuit breaker. As before, input terminals T1 and T2 receive power from electrical power lines, and output terminals T3, T4 provide power to an associated load. Power supply 2b connected across the output terminals T3, T4 to provide power to a fault detector and control circuit 1b connected across the output terminals.

As long as the output terminal voltage between terminals T3 and T4 is proper, the fault detector and control circuit actuates switch S1 interposed between terminals T1, T3 to a closed condition. A voltage abnormality of sufficient magnitude will cause the fault detector and control circuit 1b to operate switch S1 to an open condition, thereby interrupting power transfer. The circuit breaker system shown in FIG. 9 is initialized to a power-transferring condition by actuation of a manually operated momentary contact switch S2 bridging the terminals of switch S1. This energizes the power supply 2b and fault detector and control circuit 1b to actuate switch S1 to a closed condition and to maintain it there so long as the input line voltage remains within acceptable limit. To test whether or not the line voltage is within safe limits prior to closure of switch S2, a simple line voltage A.C. voltmeter M connected across terminals T1, T2 may be employed. Alternatively, a battery-powered additional fault detector and control circuit may be employed to restore operation automatically. For use with a circuit breaker which trips only in response to line overvoltage abnormalities, the fault detector circuit of FIG. 2 may be modified simply by removing the entire low-range detection circuitry branch from comparator AC2 to diode D6.

While he invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances, even the specific claims involved should be construed in light of the doctrine of equivalents.

I claim:

1. In a line voltage surge protection circuit for protecting an electrically-powered appliance, said circuit having input power terminal means adapted for connection to A.C. power lines, output terminal means adapted for connection to an electrical load, switching means operable between a closed condition for coupling an A.C. voltage delivered to said input terminal means to said output terminal means and to an open condition at least substantially attenuating the delivery of input voltage to said output terminal means, a line voltage abnormality sensing circuit responsively coupled to a chosen one of said terminal means for producing an abnormality-indicating control signal condition responsively to the departure of the input voltage waveform developed across said chosen terminal means beyond at least one given limit and control means responsively coupled to said sensing circuit and actuatingly coupled to said switching means for operating said switching means from said closed to said open condition responsively to appearance of said abnormality-indicating signal condition, the improvement wherein:

said abnormality-sensing circuit includes waveform generating means for producing a rate-of-change output waveform having an instantaneous value which varies generally according to the time rate of change of a sinusoidal power line voltage of given frequency supplied to said input terminal means so as to provide said output waveform as a waveform having no nulls while spanning the axis crossings of said input terminal voltage and which increases abruptly in response to a phase-coherent increase in the rate-of-change of said terminal input voltage attendant to any axis crossing; and detector circuit means responsive to said rate-of-change output waveform for providing said abnormality-indicating signal responsively to an increase of said rate-of-change waveform beyond a given threshold value.

2. The surge protection circuit of claim 1 wherein said waveform generating means includes differentiating circuit means for providing said rate-of-change output waveform.

3. The surge protection circuit of claim 1 wherein said waveform generating means includes means for producing said waveform as a composite waveform of instantaneous amplitude governed by said rate-of-change of sinusoidal terminal voltage in the general vicinity of said axis crossings and governed by the instantaneous amplitude of said sinusoidal voltage in the general vicinity of the maxima of said terminal voltage.

4. The surge protection circuit of claim 3 wherein said waveform generating means in response to a sinusoidal terminal voltage of constant amplitude across said chosen terminal means produces said output waveform as a continuous waveform bounded between upper and lower limits and having no nulls and maintaining said upper limit below said given threshold value responsively to a terminal sinusoidal voltage having a given amplitude.

5. The surge protection circuit of claim 4 wherein the upper limit of said output waveform increases with increasing amplitude of said terminal sinusoidal voltage waveform and said detector circuit means includes comparator means associated therewith for providing said abnormality-indicating signal condition responsively to output waveform having upper limits above a given threshold value.

6. The surge protection circuit of claims 1, 2, 3, 4, or 5 wherein said waveform-generating means includes means for providing output first voltage replicas of alternate half-cycles of said terminal voltage waveform in phase therewith, output second voltage replicas of the intervening half-cycles of said terminal voltage waveform in phase therewith, output third voltage replicas of said alternate half-cycle waveform displaced in phase therefrom by approximately 90°, output fourth voltage replicas of said remaining half-cycles displaced therefrom by approximately 90°, and means for causing each of said output first, second, third, and fourth voltage replicas during the duration thereof to respond to transient disturbances of said terminal voltage by a change in voltage amplitude of said output first, second, third, and fourth voltage replicas substantially simultaneously therewith, and said detector circuit means includes means for providing said abnormality-indicating signal condition responsively to such change in amplitude beyond given lower and upper limits in any of said output voltage replicas.

7. The surge protection circuit of claim 6 wherein said waveform-generating means includes means for providing all of said output voltage replicas in the form of pulses of common polarity, means for combining said output voltage replicas to form said output waveform as a continuous composite waveform having no nulls and being bounded within upper and lower limits corresponding to a sinusoidal voltage of given amplitude value across said chosen terminal means, and said detector circuit means includes means for providing said abnormality-indicating signal condition responsively to detection of excursions of said output waveform replicas beyond a given upper limit.

8. The surge protection circuit of claim 7 wherein said waveform-generating means includes at least one differentiating phase shift network coupled to derive its input voltage from the voltage on said chosen terminal means and having a transient response time negligibly short in comparison to the period of said terminal sinusoidal voltage waveform, said network producing a network output voltage as a replica of a sinusoidal terminal voltage across said chosen terminal means and shifted in phase by approximately 90° with respect thereto, said waveform-generating means including means for incorporating said network output voltage into said output voltage of said waveform-generating means.

9. The surge protection circuit of claim 8 further including:
   a summing resistor;
   a first diode coupled to receive a replica of said terminal voltage waveform and connected to said summing resistor so as to provide at least portions of said first output voltage replicas at a given polarity to said resistor;
   a first invertor circuit coupled to receive a replica of said terminal voltage waveform;
   a second diode connected to couple the output of said first invertor circuit to said summing resistor so as to provide at least portions of said second output voltage replicas to said summing resistor at said given polarity;
   a third diode connected to couple a signal derived from the output of said phase shift network to said resistor so as to provide at least portions of said third output voltage replica to said summing resistor at said given polarity;
   a second invertor coupled to be driven by a signal derived from the output of said phase shift network;
   a fourth diode connected to couple the output of said second invertor circuit to said resistor so as to provide at least portions of said fourth output voltage replica to said summing resistor at said given polarity; and
   comparator means coupled to receive the voltage developed across said resistor for providing said abnormality indicating control signal condition responsively to excursions of resistor voltage above a given value.

10. The surge protection circuit of claim 9 further including filter means for substantially removing from the output signal of said comparator means ripple pulses produced when the maxima of said composite waveform exceed said given maximum value but the minima thereof do not.

11. The surge protection circuit of claim 10 wherein each said filter means includes transient filter means for removing from the output signal received from said comparator means voltage pulses of duration shorter than given value.

* * * * *